US006473733B1

(12) United States Patent
McArthur et al.

(10) Patent No.: US 6,473,733 B1
(45) Date of Patent: Oct. 29, 2002

(54) SIGNAL ENHANCEMENT FOR VOICE CODING

(75) Inventors: Dean McArthur, Burlington; Jim Reilly, Hamilton, both of (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 09/452,623

(22) Filed: Dec. 1, 1999

(51) Int. Cl.[7] .............................................. G10L 15/20

(52) U.S. Cl. ....................... 704/224; 704/233; 704/226; 704/200.1

(58) Field of Search ................................ 704/233, 200, 704/200.1, 226, 224, 234, 227, 228; 379/410

(56) References Cited

U.S. PATENT DOCUMENTS 5,307,405 A * 4/1994 Sih ........................... 370/290
5,396,189 A * 3/1995 Hays .......................... 330/136
5,507,036 A * 4/1996 Vagher ....................... 455/295
5,528,196 A * 6/1996 Baskin et al. ............... 330/151
5,796,819 A * 8/1998 Romesburg ................. 370/291
5,920,834 A * 7/1999 Sih et al. ............... 379/406.06
6,005,640 A * 12/1999 Strolle et al. ............... 348/555
6,122,384 A * 9/2000 Mauro ....................... 381/94.1

* cited by examiner

*Primary Examiner*—Richemond Dorvil
(74) *Attorney, Agent, or Firm*—Jones, Day, Reavis & Pogue; Charles B. Meyer, Esq.; Krishna K. Pathiyal, Esq.

(57) ABSTRACT

An adaptive noise suppression system includes an input A/D converter, an analyzer, a filter, and a output D/A converter. The analyzer includes both feed-forward and feedback signal paths that allow it to compute a filtering coefficient, which is input to the filter. In these paths, feed-forward signal are processed by a signal to noise ratio estimator, a normalized coherence estimator, and a coherence mask. Also, feedback signals are processed by a auditory mask estimator. These two signal paths are coupled together via a noise suppression filter estimator. A method according to the present invention includes active signal processing to preserve speech-like signals and suppress incoherent noise signals. After a signal is processed in the feed-forward and feedback paths, the noise suppression filter estimator then outputs a filtering coefficient signal to the filter for filtering the noise out of the speech and noise digital signal.

43 Claims, 2 Drawing Sheets

SIGNAL ENHANCEMENT FOR VOICE CODING

BACKGROUND OF THE INVENTION

1. Field of the Invention

The present invention is in the field of voice coding. More specifically, the invention relates to a system and method for signal enhancement in voice coding that uses active signal processing to preserve speech-like signals and suppresses incoherent noise signals.

2. Description of the Related Art

The emergence of wireless telephony and data terminal products has enabled users to communicate with anyone from almost anywhere. Unfortunately, current products do not perform equally well in many of these environments, and a major source of performance degradation is ambient noise. Further, for safe operation, many of these hand-held products need to offer hands-free operation, and here in particular, ambient noise possess a serious obstacle to the development of acceptable solutions.

Today's wireless products typically use digital modulation techniques to provide reliable transmission across a communication network. The conversion from analog speech to a compressed digital data stream is, however, very error prone when the input signal contains moderate to high ambient noise levels. This is largely due to the fact that the conversion/compression algorithm (the vocoder) assumes the input signal contains only speech. Further, to achieve the high compression rates required in current networks, vocoders must employ parametric models of noise-free speech. The characteristics of ambient noise are poorly captured by these models. Thus, when ambient noise is present, the parameters estimated by the vocoder algorithm may contain significant errors and the reconstructed signal often sounds unlike the original. For the listener, the reconstructed speech is typically fragmented, unintelligible, and contains voice-like modulation of the ambient noise during silent periods. If vocoder performance under these conditions is to be improved, noise suppression techniques tailored to the voice coding problem are needed.

Current telephony and wireless data products are generally designed to be hand held, and it is desirable that these products be capable of hands-free operation. By hands-free operation what is meant is an interface that supports voice commands for controlling the product, and which permits voice communication while the user is in the vicinity of the product. To develop these hands-free products, current designs must be supplemented with a suitably trained voice recognition unit. Like vocoders, most voice recognition methods rely on parametric models of speech and human conversation and do not take into account the effect of ambient noise.

SUMMARY OF THE INVENTION

An adaptive noise suppression system (ANSS) is provided that includes an input A/D converter, an analyzer, a filter, and an output D/A converter. The analyzer includes both feed-forward and feedback signal paths that allow it to compute a filtering coefficient, which is then input to the filter. In these signal paths, feed-forward signals are processed by a signal-to-noise ratio (SNR) estimator, a normalized coherence estimator and a coherence mask. The feedback signals are processed by an auditory mask estimator. These two signal paths are coupled together via a noise suppression filter estimator. A method according to the present invention includes active signal processing to preserve speech-like signals and suppress incoherent noise signals. After a signal is processed in the feed-forward and feedback paths, the noise suppression filter estimator outputs a filtering coefficient signal to the filter for filtering the noise from the speech-and-noise digital signal.

The present invention provides many advantages over presently known systems and methods, such as: (1) the achievement of noise suppression while preserving speech components in the 100–600 Hz frequency band; (2) the exploitation of time and frequency differences between the speech and noise sources to produce noise suppression; (3) only two microphones are used to achieve effective noise suppression and these may be placed in an arbitrary geometry; (4) the microphones require no calibration procedures; (5) enhanced performance in diffuse noise environments since it uses a speech component; (6) a normalized coherence estimator that offers improved accuracy over shorter observation periods; (7) makes the inverse filter length dependent on the local signal-to-noise ratio (SNR); (8) ensures spectral continuity by post filtering and feedback; (9) the resulting reconstructed signal contains significant noise suppression without loss of intelligibility or fidelity where for vocoders and voice recognition programs the recovered signal is easier to process. These are just some of the many advantages of the invention, which will become apparent to one of ordinary skill upon reading the description of the preferred embodiment, set, forth below.

As will be appreciated, the invention is capable of other and different embodiments, and its several details are capable of modifications in various respects, all without departing from the invention. Accordingly, the drawings and description of the preferred embodiments are illustrative in nature and not restrictive.

DETAILED DESCRIPTION OF THE PREFERRED EMBODIMENT

Figure 1:
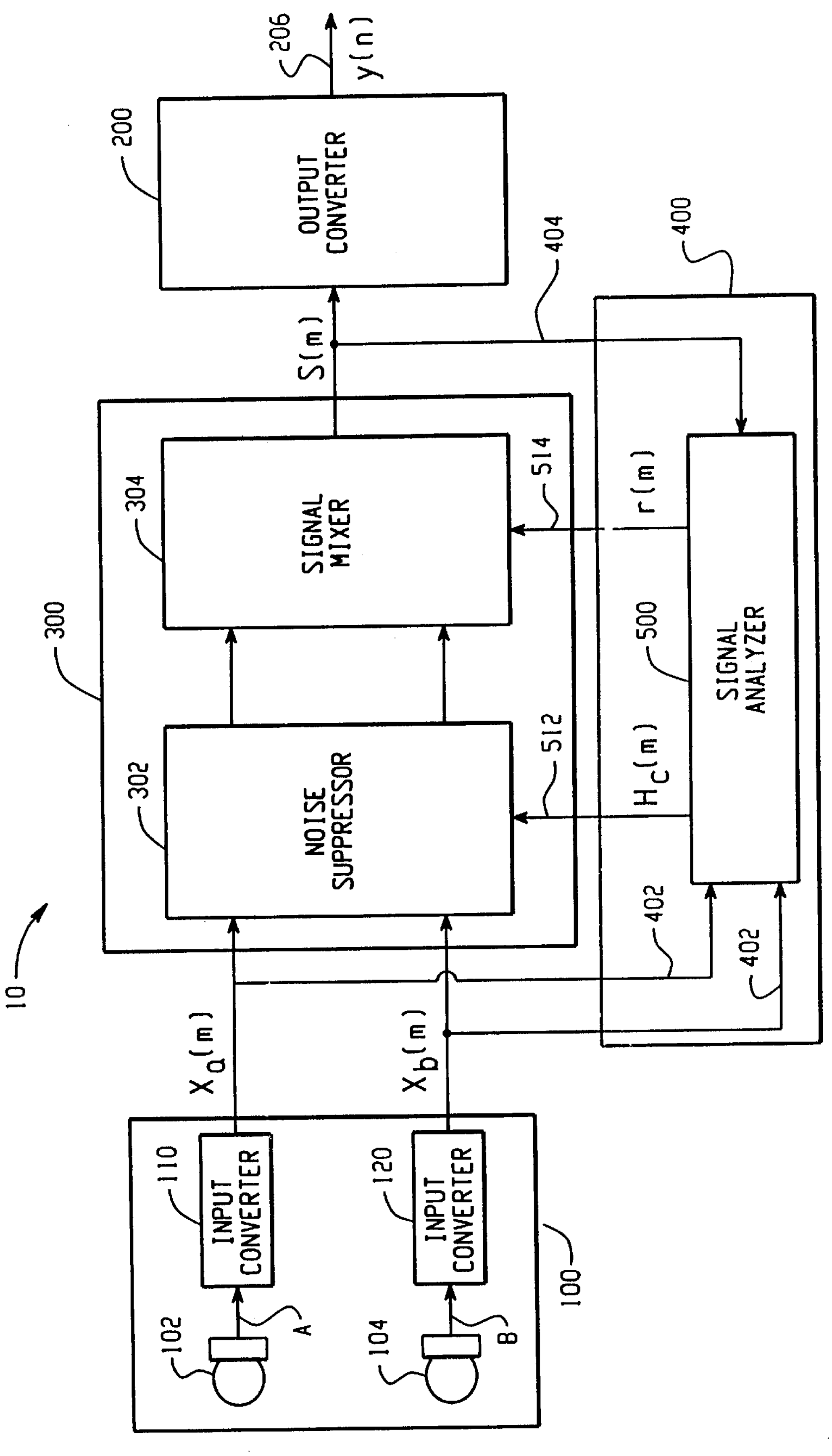
FIG. 1 is a high-level signal flow block diagram of the preferred embodiment of the present invention.

Turning now to the drawing figures, FIG. 1 sets forth a preferred embodiment of an adaptive noise suppression system (ANSS) 10 according to the present invention. The data flow through the ANSS 10 flows through an input converting stage 100 and an output converting stage 200. Between the input stage 100 and the output stage 200 is a filtering stage 300 and an analyzing stage 400. The analyzing stage 400 includes a feed-forward path 402 and a feedback path 404.

Analog signals A(n) and B(n) are first received in the input stage 100 at receivers 102 and 104, which are preferably microphones. These analog signals A and B are then converted to digital signals $X_n(m)$ (n=a,b) in input converters 110 and 120. After this conversion, the digital signals $X_n(m)$ are fed to the filtering stage 300 and the feed-forward path 402 of the analyzing stage 400. The filtering stage 300 also receives control signals $H_c(m)$ and r(m) from the analyzing stage 400, which are used to process the digital signals $X_n(m)$.

In the filtering stage 300, the digital signals $X_n(m)$ are passed through a noise suppressor 302 and a signal mixer 304, and generate output digital signals S(m). Subsequently, the output digital signals S(m) from the filtering stage 300 are coupled to the output converter 200 and the feedback path 404. Digital signals $X_n(m)$ and S(m) transmitted through paths 402 and 464 are received by a signal analyzer 500, which processes the digital signals $X_n(m)$ and S(m) and outputs control signals $H_c(m)$ and r(m) to the filtering-stage 300. Preferably, the control signals include a filtering coefficient $H_c(m)$ on path 512 and a signal-to-noise ratio value r(m) on path 514. The filtering stage 300 utilizes the filtering coefficient $H_c(m)$ to suppress noise components of the digital input signals. The analyzing stage 400 and the filtering stage 300 may be implemented utilizing either a software-programmable digital signal processor (DSP), or a programmable/hardwired logic device, or any other combination of hardware and software sufficient to carry out the described functionality.

Figure 2:
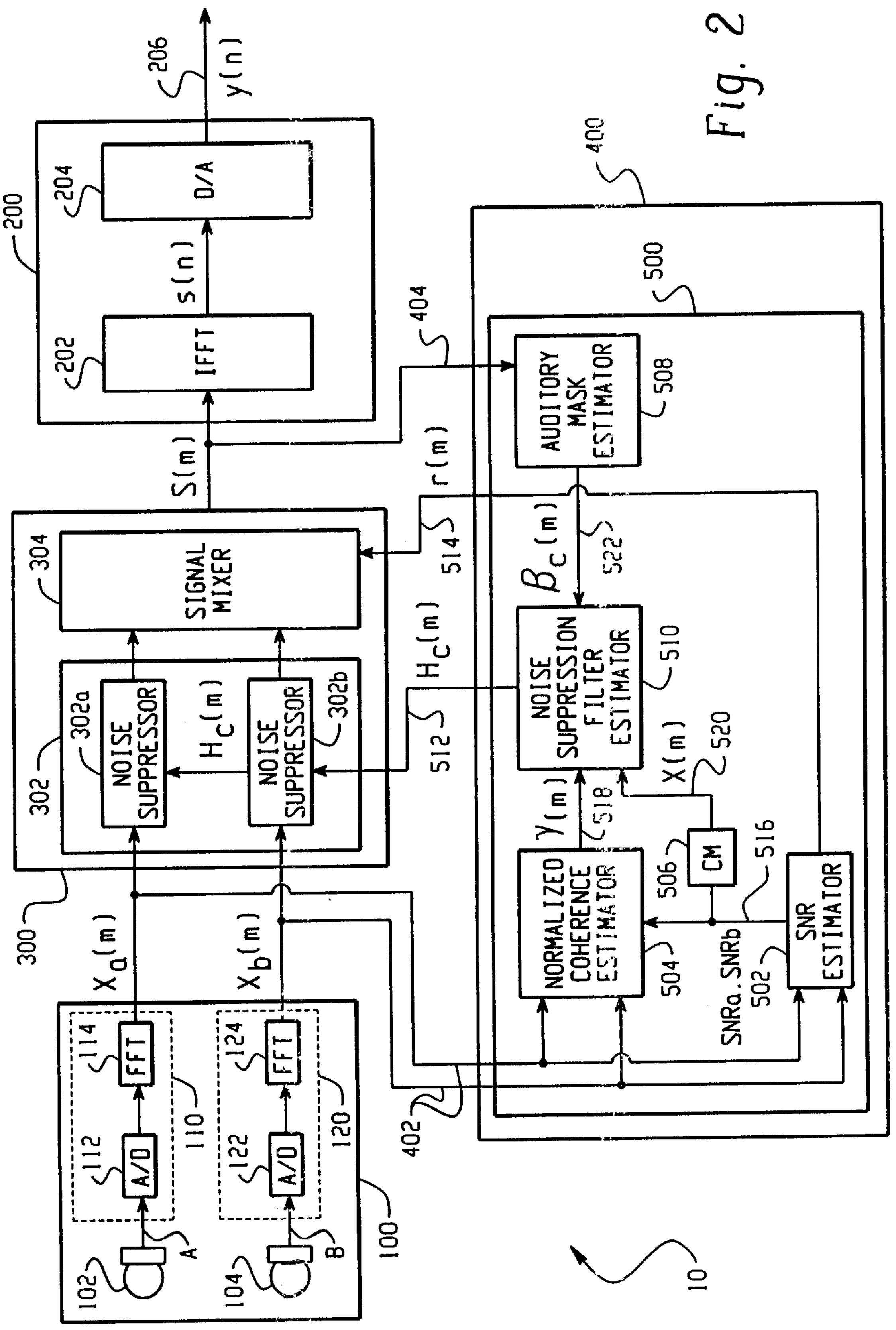
FIG. 2 is a detailed signal flow block diagram of FIG. 1.

Turning now to FIG. 2, the preferred ANSS 10 is shown in more detail. As seen in this figure, the input converters 110 and 120 include analog-to-digital (A/D) converters 112 and 122 that output digitized signals to Fast Fourier Transform (FFT) devices 114 and 124, which preferably use short-time Fourier Transform. The FFT's 114 and 124 convert the time-domain digital signals from the A/Ds 112, 122 to corresponding frequency domain digital signals $X_n(m)$, which are then input to the filtering and analyzing stages 300 and 400. The filtering stage 300 includes noise suppressors 302*a* and 302*b*, which are preferably digital filters, and a signal mixer 304. Digital frequency domain signals S(m) from the signal mixer 304 are passed through an Inverse Fast Fourier Transform (IFFT) device 202 in the output converter, which converts these signals back into the time domain s(n). These reconstructed time domain digital signals s(n) are then coupled to a digital-to-analog (D/A) converter 204, and then output from the ANSS 10 on ANSS output path 206 as analog signals y(n).

With continuing reference to FIG. 2, the feed forward path 402 of the signal analyzer 500 includes a signal-to-noise ratio estimator (SNRE) 502, a normalized coherence estimator (NCE) 504, and a coherence mask (CM) 506. The feedback path 404 of the analyzing stage 500 further includes an auditory mask estimator (AME) 508. Signals processed in the feed-forward and feedback paths, 402 and 404, respectively, are received by a noise suppression filter estimator (NSFE) 510, which generates a filter coefficient control signal $H_c(m)$ on path 512 that is output to the filtering stage 300.

An initial stage of the ANSS 10 is the A/D conversion stage 112 and 122. Here, the analog signal outputs A(n) and B(n) from the microphones 102 and 104 are converted into corresponding digital signals. The two microphones 102 and 104 are positioned in different places in the environment so that when a person speaks both microphones pick up essentially the same voice content, although the noise content is typically different. Next, sequential blocks of time domain analog signals are selected and transformed into the frequency domain using FFTs 114 and 124. Once transformed, the resulting frequency domain digital signals $X_n(m)$ are placed on the input data path 402 and passed to the input of the filtering stage 300 and the analyzing stage 400.

A first computational path in the ANSS 10 is the filtering path 300. This path is responsible for the identification of the frequency domain digital signals of the recovered speech. To achieve this, the filter signal $H_c(m)$ generated by the analysis data path 400 is passed to the digital filters 302*a* and 302*b*. The outputs from the digital filters 302*a* and 302*b* are then combined into a single output signal S(m) in the signal mixer 304, which is under control of second feed-forward path signal r(m). The mixer signal S(m) is then placed on the output data path 404 and forwarded to the output conversion stage 200 and the analyzing stage 400.

The filter signal $H_c(m)$ is used in the filters 302*a* and 302*b* to suppress the noise component of the digital signal $X_n(m)$. In doing this, the speech component of the digital signal $X_n(m)$ is somewhat enhanced. Thus, the filtering stage 300 produces an output speech signal S(m) whose frequency components have been adjusted in such a way that the resulting output speech signal S(m) is of a higher quality and is more perceptually agreeable than the input speech signal $X_n(m)$ by substantially eliminating the noise component.

The second computation data path in the ANSS 10 is the analyzing stage 400. This path begins with an input data path 402 and the output data path 404 and terminates with the noise suppression filter signal $H_c(m)$ on path 512 and the SNRE signal r(m) on path 514.

In the feed forward path of the analyzing stage 400, the frequency domain signals $X_n(m)$ on the input data path 402 are fed into an SNRE 502. The SNRE 502 computes a current SNR level value r(m), and outputs this value on paths 514 and 516. Path 514 is coupled to the signal mixer 304 of the filtering stage 300, and path 516 is coupled to the CM 506 and the NCE 504. The SNR level value, r(m), is used to control the signal mixer 304. The NCE 504 takes as inputs the frequency domain signal $X_n(m)$ on the input data path 402 and the SNR level value, r(m), and calculates a normalized coherence value $\gamma(m)$ that is output on path 518, which couples this value to the NSFE 510. The CM 506 computes a coherence mask value X(M) from the SNR level value r(m) and outputs this mask value X(m) on path 520 to the NFSE 510.

In the feedback path 404 of the analyzing stage 400, the recovered speech signals S(m) on the output data path 404 are input to an AME 508, which computes an auditory masking level value $\beta_c(m)$ that is placed on path 522. The auditory mask value $\beta_c(m)$ is also input to the NFSE 510, along with the values X(m) and $\gamma(m)$ from the feed forward path. Using these values, the NFSE 510 computes the filter coefficients $H_c(m)$, which are used to control the noise suppressor filters 302*a*, 302*b* of the filtering stage 300.

The final stage of the ANSS 10 is the D-A conversion stage 200. Here, the recovered speech coefficients S(m) output by the filtering stage 300 are passed through the IFFT 202 to give an equivalent time series block. Next, this block is concatenated with other blocks to give the complete digital time series s(n). The signals are then converted to equivalent analog signals y(n) in the D/A converter 204, and placed on ANSS output path 206.

The preferred method steps carried out using the ANSS 10 is now described. This method begins with the conversion of the two analog microphone inputs A(n) and B(n) to digital data streams. For this description, let the two analog signals at time t seconds be $x_a(t)$ and $x_b(t)$. During the analog to digital conversion step, the time series $x_a(n)$ and $x_b(n)$ are generated using $$x_a(n)=x_a(nT_s) \text{ and } x_b(n)=x_b(nT_s) \quad (1)$$

where $T_s$ is the sampling period of the A/D converters, and n is the series index.

Next, $x_a(n)$ and $x_b(n)$ are partitioned into a series of sequential overlapping blocks and each block is transformed into the frequency domain according to equation (2).

$$\left.\begin{array}{l}X_a(m) = DWx_a(n)\\ X_b(m) = DWx_b(n)\end{array}\right., m = 1 \ldots M \quad (2)$$

where $x_a(m)=[x_a(mN_s) \ldots X_a(mN_s+(N-1))]^t$, m is the block index;

M is the total number of blocks;

N is the block size;

D is the N×N Discrete Fourier Transform matrix with $$[D]_{uv} = e^{\frac{j2\pi(a-1)(v-1)}{N}}, u, v = 1 \ldots N.;$$

W is the N×N diagonal matrix with $[W]_{uu}=w(u)$ and w(n) is any suitable window function of length N; and $[x_a(m)]^t$ is the vector transpose of $x_a(m)$.

The blocks $X_a(m)$ and $X_b(m)$ are then sequentially transferred to the input data path 402 for further processing by the filtering stage 300 and the analysis stage 400.

The filtering stage 300 contains a computation block 302 with the noise suppression filters 302*a*, 302*b*. As inputs, the noise suppression filter 302*a* accepts $X_a(m)$ and filter 302*b* accepts $X_b(m)$ from the input data path 402. From the analysis stage data path 512 $H_c(m)$, a set of filter coefficients, is received by filter 302*b* and passed to filter 302*a*. The signal mixer 304 receives a signal combining weighting signal r(m) and the output from the noise suppression filter 302. Next, the signal mixer 304 outputs the frequency domain coefficients of the recovered speech S(m), which are computed according to equation (3).

$$S(m)=(r(m)X_a(m)+(1-r(m))X_b(m)H_c(m) \quad (3)$$

where $$[x{\cdot}y]_i=[x]_i[y]_i$$

The quantity r(m) is a weighting factor that depends on the estimated SNR for block m and is computed according to equation (5) and placed on data paths 516 and 518.

The filter coefficients $H_c(m)$ are applied to signals $X_a(m)$ and $X_b(m)$ (402) in the noise suppressors 302*a* and 302*b*. The signal mixer 304 generates a weighted sum S(m) of the outputs from the noise suppressors under control of the signal r(m) 514. The signal r(m) favors the signal with the higher SNR. The output from the signal mixer 304 is placed on the output data path 404, which provides input to the conversion stage 200 and the analysis stage 400.

The analysis filter stage 400 generates the noise suppression filter coefficients, $H_c(m)$, and the signal combining ratio, r(m), using the data present on the input 402 and output 404 data paths. To identify these quantities, five computational blocks are used: the SNRE 502, the CM 506, the NCE 504, the AME 508, and the NSFE 510.

Described below is the computation performed in each of these blocks beginning with the data flow originating at the input data path 402. Along this path 402, the following computational blocks are processed: The SNRE 502, the NCE 504, and the CM 506. Next, the flow of the speech signal S(m) through the feedback data path 404 originating with the output data path is described. In this path 404, the auditory mask analysis is performed by AME 508. Lastly, the computation of $H_c(m)$ and r(m) is described.

From the input data path 402, the first computational block encountered in the analysis stage 400 is the SNRE 502. In the SNRE 502, an estimate of the SNR that is used to guide the adaptation rate of the NCE 504 is determined. In the SNRE 502 an estimate of the local noise power in $X_a(m)$ and $X_b(m)$ is computed using the observation that relative to speech, variations in noise power typically exhibit longer time constants. Once the SNRE estimates are computed, the results are used to ratio-combine the digital filter 302*a* and 302*b* outputs and in the determination of the length of $H_c(m)$ (Eq. 9).

To complete the local SNR in the SNRE 502, exponential averaging is used. By employing different adaptation rates in the filters, the signal and noise power contributions in $X_a(m)$ and $X_b(m)$ can be approximated at block m by $$SNR_a(m)=(Es_as_a^H(m)Es_as_a(m))/(En_an_a^H(m)En_an_a(m))$$

$$SNR_b(m)=(Es_bs_b^H(m)Es_bs_b(m))/(En_bn_b^H(m)En_bn_b(m)) \quad (4\ a,b)$$

where $Es_as_a(m)$, $En_an_a(m)$, $Es_bs_b(m)$, and $En_bn_b(m)$ are the N-element vectors;

$$Es_as_a(m)=Es_as_a(m-1)+\alpha_{s_a}\cdot X_a^*(m)\cdot X_a(m); \quad (4c)$$

$$Es_bs_b(m)=Es_bs_b(m-1)+\alpha_{s_b}\cdot X_b^*(m)\cdot X_b(m); \quad (4d)$$

$$En_an_a(m)=En_an_a(m-1)+\alpha_{n_2}\cdot X_a^*(m)\cdot X_a(m); \quad (4e)$$

$$En_bn_b(m)=En_bn_b(m-1)+\alpha_{n_b}\cdot X_b^*(m)\cdot X_b(m); \quad (4f)$$

$$[\alpha_{s_a}]_i = \begin{cases}\mu_{s_a} & \text{for } [Es_as_a(m-1)]_i \le [X_a^*(m)\cdot X_a(m)]_i\\ \delta_{s_a} & \text{for } [Es_as_a(m-1)]_i > [X_a^*(m)\cdot X_a(m)]_i\end{cases}; \quad (4g)$$

$$[\alpha_{n_a}]_i = \begin{cases}\mu_{n_a} & \text{for } [En_an_a(m-1)]_i \le [X_a^*(m)\cdot X_a(m)]_i\\ \delta_{n_a} & \text{for } [En_an_a(m-1)]_i > [X_a^*(m)\cdot X_a(m)]_i\end{cases}; \quad (4h)$$

$$[\alpha_{s_b}]_i = \begin{cases}\mu_{s_b} & \text{for } [Es_bs_b(m-1)]_i \le [X_b^*(m)\cdot X_b(m)]_i\\ \delta_{s_b} & \text{for } [Es_bs_b(m-1)]_i > [X_b^*(m)\cdot X_b(m)]_i\end{cases}; \quad (4i)$$

$$[\alpha_{nb}] = \begin{cases}\mu_{n_b} & \text{for } [En_bn_b(m-1)]_i \le [X_b^*(m)\cdot X_b(m)]_i\\ \delta_{n_b} & \text{for } [En_bn_b(m-1)]_i > [X_b^*(m)\cdot X_b(m)]_i\end{cases}. \quad (4j)$$

In these equations, 4(c)–4j), x* is the conjugate of x, and $\mu_{s_a}$, $\mu_{s_b}$, $\mu_{n_a}$, $\mu_{n_b}$, are application specific adaptation parameters associated with the onset of speech and noise, respectively. These may be fixed or adaptively computed from $X_a(m)$ and $X_b(m)$. The values $\delta_{s_a}$, $\delta_{s_b}$, $\delta_{n_a}$, $\delta_{n_b}$, are application specific adaptation parameters associated with the decay portion of speech and noise, respectively. These also may be fixed or adaptively computed from $X_a(m)$ and $X_b(m)$.

Note that the time constants employed in computation of $Es_as_a(m)$, $En_an_a(m)$, $Es_bs_b(m)$, $En_bn_b(m)$ depend on the direction of the estimated power gradient. Since speech signals typically have a short attack rate portion and a longer decay rate portion, the use of two time constants permits better tracking of the speech signal power and thereby better SNR estimates.

The second quantity computed by the SNR estimator 502 is the relative SNR index r(m), which is defined by $$r(m) = \frac{SNR_a(m)}{SNR_a(m) + SNR_b(m)}. \quad (5)$$

This ratio is used in the signal mixer 304 (Eq. 3) to ratio-combine the two digital filter output signals.

From the SNR estimator 502, the analysis stage 400 splits into two parallel computation branches: the CM 506 and the NCE 504.

In the ANSS method, the filtering coefficient $H_c(m)$ is designed to enhance the elements of $X_a(m)$ and $X_b(m)$ that are dominated by speech, and to suppress those elements that are either dominated by noise or contain negligible psycho-acoustic information. To identify the speech dominant passages, the NCE 504 is employed, and a key to this approach is the assumption that the noise field is spatially diffuse. Under this assumption, only the speech component of $x_a(t)$ and $x_b(t)$ will be highly cross-correlated, with proper placement of the microphones. Further, since speech can be modeled as a combination of narrowband and wideband signals, the evaluation of the cross-correlation is best performed in the frequency domain using the normalized coherence coefficients $\gamma_{ab}(m)$. The $i^{th}$ element of $\gamma_{ab}(m)$ is given by $$[\gamma_{ab}(m)]_i = \frac{\left(\frac{[Es_as_b(m) - En_an_b(m)]_i}{\sqrt{[Es_as_a(m)\cdot Es_bs_b(m)]_i}}\right)}{[\tau((SNR_a(m)+SNR_b(m))/2)]_i},\ i = 1 \ldots N \tag{6}$$

where $$Es_as_b(m)=Es_as_b(m-1)+\alpha_{s_{ab}}\cdot X_a^*(m)\cdot X_b)(m); \tag{6a}$$

$$En_an_b(m)=En_an_b(m-1)+\alpha_{n_{ab}}\cdot X_a^*(m)\cdot X_b(m) \tag{6b}$$

$$[\alpha_{s_{ab}}]_i = \begin{cases} \mu_{s_{ab}} & \text{for } |Es_as_b(m-1)|_i \le |X_a^*(m)\cdot X_b(m)|_i \\ \delta_{s_{ba}} & \text{for } |Es_as_b(m-1)|_i > |X_a^*(m)\cdot X_b(m)|_i \end{cases}; \tag{6c}$$

$$[\alpha_{n_{ab}}]_i = \begin{cases} \mu_{n_{ab}} & \text{for } |En_an_b(m-1)|_i \le |X_b^*(m)\cdot X_b(m)|_i \\ \delta_{n_{ba}} & \text{for } |En_an_b(m-1)|_i > |X_b^*(m)\cdot X_b(m)|_i \end{cases}; \tag{6d}$$

In these equations, 6(a)–6(d), $|x|^2=x^*\cdot x$ and $\tau(a)$is a normalization function that depends on the packaging of the microphones and may also include a compensation factor for uncertainty in the time alignment between $x_a(t)$ and $x_b(t)$. The values $\mu_{s_{ab}}$, $\mu_{n_{ab}}$ are application, specific adaptation parameters associated with the onset of speech and the values $\delta_{s_{ab}}$, $\delta_{n_{ab}}$ are application specific adaptation parameters associated with the decay portion of speech.

After completing the evaluation of equation (6), the resultant $\gamma_{ab}(m)$ is placed on the data path 518.

The performance of any ANSS system is a compromise between the level of distortion in the desired output signal and the level of noise suppression attained at the output. This proposed ANSS system has the desirable feature that when the input SNR is high, the noise suppression capability of the system is deliberately lowered, in order to achieve lower levels of distortion at the output. When the input SNR is low, the noise suppression capability is enhanced at the expense of more distortion at the output. This desirable dynamic performance characteristic is achieved by generating a filter mask signal X(m) 520 that is convolved with the normalized coherence estimates, $\gamma_{ab}(m)$, to give $H_c(m)$ in the NSFE 510. For the ANSS algorithm, the filter mask signal equals $$X(m)=D_\chi((SNR_a(m)+SNR_b(m))/2) \tag{7}$$

where $\chi(b)$ is an N-element vector with $$[\chi(b)]_i = \begin{cases} 1 & i \le N/2 \\ e^{-((b-\chi_{th})(i-N/2)/\chi)} & N \ge i > N/2 \end{cases},\ \text{and where}$$

$\chi_{th}$, $\chi_s$ are implementation specific parameters.

Once computed, X(m) is placed on the data path 520 and used directly in the computation of $H_c(in)$ (Eq. 9). Note that X(m) controls the effective length of the filtering coefficient $H_c(m)$.

The second input path in the analysis data path is the feedback data path 404, which provides the input to the auditory mask estimator 508. By analyzing the spectrum of the previous block, the N-element auditory mask vector, $\beta_c(m)$, identifies the relative perceptual importance of each component of S(m). Given this information and the fact that the spectrum varies slowly for modest block size N. $H_c(m)$ can be modified to cancel those elements of S(m) that contain little psycho-acoustic information and are therefore dominated by noise. This cancellation has the added benefit of generating a spectrum that is easier for most vocoder and voice recognition systems to process.

The AME508 uses psycho-acoustic theory that states if adjacent frequency bands are louder than a middle band, then the human auditory system does not perceive the middle band and this signal component is discarded. The AME508 is responsible for identifying those bands that are discarded since these bands are not perceptually significant. Then, the information from the AME508 is placed in path 522 that flows to the NSFE 510. Through this, the NSFE 510 computes the coefficients that are placed on path 512 to the digital filter 302 providing the noise suppression.

To identify the auditory mask level, two detection levels must be computed: an absolute auditory threshold and the speech induced masking threshold, which depends on S(m). The auditory masking level is the maximum of these two thresholds or $$\beta_c(m)=\max(\Psi_{abs},\Psi S(m-1)) \tag{8}$$

where $\Psi_{abs}$ is an N-element vector containing the absolute auditory detection levels at frequencies $$\left(\frac{u-1}{NT_s}\right)$$

$$Hz \text{ and } u=1 \ldots N; \tag{8b}$$

$$[\Psi_{abs}]_i = \Psi_a\left(\frac{i-1}{NT_s}\right); \tag{8b}$$

$$\Psi_a(f) \cong \frac{180.17}{T_s}10^{(\Psi_a(f)/10-12)}; \tag{8c}$$

$$\Psi_a(f) \cong \begin{cases} 34.97 - \dfrac{10\log(f)}{\log(50)}, & f \le 500 \\ 4.97 - \dfrac{4\log(f)}{\log(1000)}, & f > 500 \end{cases}; \tag{8d}$$

Ψ is the N×N Auditory Masking Transform;

$$[\Psi]_{uv}=T\left(\frac{2(u-1)}{NT_s},\ \frac{2(v-1)}{NT_s}\right),\ u,v,=1,\ \dots\ ,N \tag{8e}$$

$$T(f_m;f)=\begin{cases}T_{\max}(f_m)\left(\frac{f}{f_m}\right)^{28}, & f\le f_m\\ T_{\max}(f_m)\left(\frac{f}{f_m}\right)^{-10}, & f>f_m\end{cases}; \tag{8f}$$

$$T_{\max}(f)=\begin{cases}10^{-(14.5+f/250)/10}, & f<1700\\ 10^{-2.5}, & 1700\le f<3000\\ 10^{-(25-f/1000)/10}, & f\ge 3000\end{cases}; \tag{8g}$$

The final step in the analysis stage 400 is performed by the NSFE 510. Here the noise suppression filter signal $H_c$(ml) is computed according to equation (8) using the results of the normalized coherence estimator 504 and the CM 506.

The $i^{th}$ element of $H_c(m)$ is given by $$[H_c(m)]_i=\begin{cases}0 & \text{for } [X(m)*\gamma_{ab}(m)]_i\le[\beta_c(m)]_i\\ 1 & \text{for } [X(m)*\gamma_{ab}(m)]_i\ge 1\\ [X(m)*\gamma_{ab}(m)]_i & \text{elsewhere}\end{cases} \tag{9}$$

and where

A*B is the convolution of A with B.

Following the completion of equation (9), the filter coefficients are passed to the digital filter 302 to be applied to $X_a$(m) and $X_b$(m).

The final stage in the ANSS algorithm involves reconstructing the analog signal from the blocks of frequency coefficients present on the output data path 404. This is achieved by passing S(m) through the Inverse Fourier Transform, as shown in equation (10), to give s(m).

$$s(m)=D^H S(m) \tag{110}$$

where $[D]^H$ is the Hermitian transpose of D.

Next, the complete time series, s(n), is computed by overlapping and adding each of the blocks. With the completion of the computation of s(n), the ANSS algorithm converts the s(n) signals into the output signal y(n), and then terminates.

The ANSS method utilizes adaptive filtering that identifies the filter coefficients utilizing several factors that include the correlation between the input signals, the selected filter length, the predicted auditory mask, and the estimated signal-to-noise ratio (SNR). Together, these factors enable the computation of noise suppression filters that dynamically vary their length to maximize noise suppression in low SNR passages and minimize distortion in high SNR passages, remove the excessive low pass filtering found in previous coherence methods, and remove inaudible signal components identified using the auditory masking model.

Although the preferred embodiment has inputs from two microphones, in alternative arrangements the ANS system and method can use more microphones using several combining rules. Possible combining rules include, but are not limited to, pair-wise computation followed by averaging, beam-forming, and maximum-likelihood signal combining.

The invention has been described with reference to preferred embodiments. Those skilled in the art will perceive improvements, changes, and modifications. Such improvements, changes and modifications are intended to be covered by the appended claims.

We claim:

1. A signal processing system, comprising:

a first converting device configured to output digital signals;

an analysis device, said analysis device having both a feed forward and feedback signal path;

a filtering device, said filtering device being operatively coupled to said first converting device and said analysis device; and a second converting device configured to output analog signals;

wherein said analysis device includes a signal-to-noise ratio (SNR) estimator, a coherence mask, and a normalized coherence estimator in the feed-forward signal path.

2. A signal processing system, comprising:

a first converting device configured to output digital signals;

an analysis device, said analysis device having both a feed forward and feedback signal path;

a filtering device, said filtering device being operatively coupled to said first converting device and said analysis device; and a second converting device configured to output analog signals;

wherein said analysis device includes an auditory mask estimator in the feedback signal path.

3. A signal processing system, comprising:

a first converting device configured to output digital signals;

an analysis device, said analysis device having both a feed forward and feedback signal path;

a filtering device, said filtering device being operatively coupled to said first converting device and said analysis device; and a second converting device configured to output analog signals;

wherein said analysis device includes an SNR estimator, a coherence mask, and a noise suppression filter estimator wherein said coherence mask is configured to receive and pass to said noise suppression filter estimator signals with a plurality of magnitudes from said SNR estimator.

4. A signal processing system, comprising:

a first converting device configured to output digital signals;

an analysis device, said analysis device having both a feed forward and feedback signal path;

a filtering device, said filtering device being operatively coupled to said first convening device and said analysis device; and a second converting device configured to output analog signals;

wherein said analysis device includes a normalized coherence estimator that is configured to receive said digital signals from said first converting device, said normalized coherence estimator being configured to identify predetermined components of said digital signals.

5. The system of claim 4, wherein said predetermined components are voice or speech components.

6. A signal processing system, comprising:

a first converting device configured to output digital signals;

an analysis device, said analysis device having both a feed forward and feedback signal path;

a filtering device, said filtering device being operatively coupled to said first converting device and said analysis device; and a second converting device configured to output analog signals;

wherein said analysis device includes a coherence mask, a normalized coherence estimator, and an noise suppression filter estimator, said noise suppression filter estimator being configured to convolve signals from the coherence mask and the normalized coherence estimator to compute a filtering coefficient that is output to said filtering device.

7. The system of claim 6, wherein said analysis device further includes a auditory mask estimator that receives signals from said filtering device and is configured to process said signals by comparing them to two threshold values.

8. The system of claim 7, wherein said threshold values are a absolute auditory threshold value and a speech induced masking threshold.

9. The system of claim 7, wherein said coherence mask, said normalized coherence estimator, and said noise suppression filter estimator are in the feed-forward signal path and said auditory mask estimator is in said feedback signal path.

10. A signal processing system, comprising:

a first converting device configured to output digital signals;

an analysis device, said analysis device having both a feed forward and feedback signal path;

a filtering device, said filtering device being operatively coupled to said first converting device and said analysis device; and a second converting device configured to output analog signals;

wherein:

said feed-forward signal path of said analysis device includes a signal-to-noise ratio (SNR) estimator, a coherence mask, and a normalized coherence estimator;

said feedback signal path of said analysis device includes a auditory mask analyzer; and said feed-forward and said feedback signal paths are coupled through a noise suppression filter estimator such that said noise suppression filter estimator is configured to compute a noise suppression filter coefficient based on said digital signals from said feedback and feed-forward signal paths.

11. A method comprising the steps of:

converting a time-domain analog signal to a frequency domain digital signal;

filtering said digital signal and outputting a filtered signal;

analyzing said digital signal in a feed-forward path of an analysis device and said filtered signal in a feedback path in said analysis device and outputting an analyzed signal based on said digital and filtered signals such that said filtering step is based on said analyzed signal; and converting said filtered signal into an time-domain analog signal.

12. The method of claim 11, wherein the analyzing step further comprises the step of determining signal-to-noise ratio values.

13. The method of claim 11, wherein the analyzing step further comprises the step of determining normalized coherence values.

14. The method of claim 11, wherein the analyzing step further comprises the step of determining coherence mask values.

15. The method of claim 11, wherein the analyzing step further comprises the step of determining auditory mask signal values.

16. The method of claim 11, wherein the analyzing step further comprises the step of determining filter coefficient values.

17. The method of claim 11, wherein the analyzing step further comprises the steps of:

determining SNR values;

determining normalized coherence values;

determining coherence mask values;

determining auditory mask values; and processing said normalized coherence values, said coherence mask values, and said auditory mask values to compute filter coefficient values.

18. The method of claim 11, wherein the analyzing step further comprises the step of determining SNR values using exponential averaging wherein said SNR values are used to determined normalized coherence values and coherence mask values.

19. The method of claim 11, wherein the analyzing step further comprises the step of identifying speech or voice components of said digital signal based on said digital signal having a diffuse noise field such that said speech or voice components are cross-correlated as a combination of narrowband and wideband signals wherein evaluation of said digital signal performed in a frequency domain using normalized coherence coefficients.

20. The method of claim 11, wherein the analyzing step further comprises the step of determining SNR values, wherein said SNR values are used to determine coherence mask values such that said coherence mask values are utilized in computing a filtering, coefficient.

21. The method of claim 11, wherein the analyzing step further comprises the step of:

utilizing an auditory mask device to spectrally analyze said digital signal to identify a predetermined component of said digital signal; and utilizing two predetermined threshold levels in said auditory mask device such that only digital signals that contain high psycho-acoustic components are transmitted through said auditory mask device.

22. The method of claim 21, wherein said two detection levels include an absolute auditory threshold and a speech induced masking threshold.

23. The method of claim 11, wherein the analyzing step further comprises the steps of:

determining normalized coherence values and coherence mask values in said feed-forward path;

determining auditory mask values in said feedback path; and determining filter coefficient values, which are utilized in the filtering step, based on said normalized coherence, said coherence mask values and said auditory mask values.

24. The method of claim 11, further comprising the step of using software programmable DSPs to perform said analyzing and filtering steps.

25. The method of claim 11, further comprising the step of using programmable or hardwired logic devices to perform aid analyzing and filtering steps.

26. The method of claim 11, further comprising the steps of:

using a software programmable DSP for the analyzing step; and using a programmable or hardwired logic device for the filtering step.

27. The method of claim 11, further comprising the steps of:

using a software programmable DSP for the filtering step; and using a programmable or hardwired logic device for the analyzing step.

28. An adaptive noise suppression system, comprising:

means for converting time domain analog input signals to frequency domain digital signals;

means for analyzing said digital signals such that said digital signals are coupled to said means for analyzing through a feed-forward and feedback signal path in said means for analyzing;

means for filtering said digital signals coupled to said means for analyzing; and means for converting said digital signals to time domain analog output signals.

29. The system of claim 28, wherein said means for filtering receives said digital signals and an analyzed signal from said means for analyzing.

30. The system of claim 28, wherein said feed-forward signal path in said means for analyzing includes means for determining SNR values.

31. The system of claim 28, wherein said feed-forward signal path in said means for analyzing includes means for determining normalized coherence values.

32. The system of claim 28, wherein said feed-forward signal path in said means for analyzing includes means for determining coherence mask values.

33. The system of claim 28, wherein said feed-forward signal path in said means for analyzing includes:

means for determining SNR values; and means for determining coherence mask values.

34. The system of claim 28, wherein said feed-forward signal path in said means for analyzing includes:

means for determining SNR values; and means for determining normalized coherence values.

35. The system of claim 28, wherein said feed-forward signal path in said means for analyzing includes:

means for determining normalized coherence values; and means for determining coherence mask values.

36. The system of claim 28, wherein said feedback signal path in said means for analyzing includes means for determining auditory mask values.

37. The system of claim 28, wherein said means for analyzing includes means for determining filter coefficient values.

38. The system of claim 28, wherein said means for analyzing includes means for determining filter coefficient values that is coupled to the feed-forward and feedback signal paths.

39. The system of claim 28, wherein said means for analyzing further includes:

means for determining filter coefficient values;

means for determining normalized coherence values;

means for determining coherence mask values; and means for determining auditory mask values;

wherein said means for determining filter coefficient values is coupled to said means for determining normalized coherence values, said means for determining coherence mask values, and said means for determining auditory mask estimator values.

40. The system of claim 28, wherein said means for analyzing and said means for filtering are configured to operate as a programmable or hardwired logic device.

41. The system of claim 28, wherein said means for analyzing and said means for filtering are configured to operate as a software programmable DSP.

42. The system of claim 28, wherein said means for analyzing is configured to operate as a programmable or hardwired logic device and said means for filtering is configured to operate as a software programmable DSP.

43. The system of claim 28, wherein said means for filtering is configured to operate as a programmable or hardwired logic device and said means for analyzing is configured to operate as a software programmable DSP.

* * * * *

UNITED STATES PATENT AND TRADEMARK OFFICE

CERTIFICATE OF CORRECTION

PATENT NO. : 6,473,733 B1
DATED : October 29, 2002
INVENTOR(S) : Dean McArthur and Jim Reilly It is certified that error appears in the above-identified patent and that said Letters Patent is hereby corrected as shown below:

Column 10,
Line 53, change "convening" to -- converting --

Column 12,
Line 38, change "filtering, coefficient" to -- filtering coefficient --

Signed and Sealed this

Twenty-fifth Day of February, 2003

JAMES E. ROGAN
*Director of the United States Patent and Trademark Office*